(12) United States Patent
Knill

(10) Patent No.: US 7,359,221 B2
(45) Date of Patent: Apr. 15, 2008

(54) POWER SUPPLY FOR USE IN AN ELECTRONIC ENERGY METER

(75) Inventor: Alex C. Knill, Cambridge (GB)

(73) Assignee: M&FC Holding, LLC, Wilmington, DE (US)

( * ) Notice: Subject to any disclaimer, the term of this patent is extended or adjusted under 35 U.S.C. 154(b) by 362 days.

(21) Appl. No.: 11/045,645

(22) Filed: Jan. 28, 2005

(65) Prior Publication Data

US 2005/0169020 A1 Aug. 4, 2005

(51) Int. Cl.
*H02M 3/335* (2006.01)
*H02H 7/122* (2006.01)

(52) U.S. Cl. ............... 363/21.12; 363/56.1; 363/56.11

(58) Field of Classification Search ............. 363/21.12, 363/21.16, 56.03, 56.04, 16, 20, 21.01, 56.01, 363/56.09, 56.1, 56.11, 56.12
See application file for complete search history.

(56) References Cited

U.S. PATENT DOCUMENTS 3,666,994 A * 5/1972 Watson et al. ................. 361/96
4,210,947 A 7/1980 Koizumi
5,621,629 A * 4/1997 Hemminger et al. ........ 363/56.1
5,673,184 A 9/1997 Rilly et al.
5,694,304 A * 12/1997 Telefus et al. ........... 363/21.03
5,708,572 A * 1/1998 Bergk ...................... 363/21.12
5,973,941 A 10/1999 Zaim et al.
6,351,398 B1 * 2/2002 Balakrishnan et al. ... 363/56.03
6,980,443 B2 * 12/2005 Nagano et al. .......... 363/21.12

* cited by examiner

*Primary Examiner*—Matthew V. Nguyen
(74) *Attorney, Agent, or Firm*—Andrus, Sceales, Starke & Sawall, LLP

(57) ABSTRACT

A three-phase electronic electricity meter that includes a power supply circuit operable to create a constant voltage output when receiving a variable voltage input. The power supply circuit of the electricity meter receives a three-phase line voltage and converts the variable three phase line voltage to a constant DC output. The power supply circuit includes a current limiting circuit to suspend operation of the power converter when the current exceeds a selected value. The power supply circuit includes an over voltage protection that limits the maximum voltage applied to the switching component of the power supply circuit. Both the over voltage protection circuit and the current limiting circuit suspend operation of the power converter to prevent damage to the operating components of the power supply circuit.

15 Claims, 4 Drawing Sheets

POWER SUPPLY FOR USE IN AN ELECTRONIC ENERGY METER

CROSS-REFERENCE TO RELATED APPLICATION

The present application is based on and claims priority to British Patent Application Serial No. 0402319.8 filed on Feb. 3, 2004.

BACKGROUND OF THE INVENTION

The present invention generally relates to the field of electronic electricity meters. More specifically, the present invention relates to a power supply for providing power to operate the electronic monitoring circuitry contained within an electronic electricity meter. An electricity metering system monitors power lines to derive polyphase input representations of voltage and current. Because electrical uses by different consumers can vary significantly, a typical utility providers require different meters for monitoring various primary voltages. Currently, available meters exist that utilize both electromechanical and electronic circuitry to monitor the voltage and current consumption.

It has been recognized that a solid state electronic electricity meter provides a more dynamic device and a more accurate measurement of the energy consumption. However, the microprocessor-based monitoring circuitry used within electronic electricity meters requires the provision of one or more supply voltages to operate the monitoring circuitry. Internal power supplies that are capable of generating a relatively constant DC voltage from the three-phase AC line voltage being monitored have been used for this purpose. Since electric utility companies require meters for a variety of different primary AC line voltages, it has been necessary to provide power supplies that have individualized components to generate the microprocessor supply voltages from the variety of primary voltages.

Various circuit designs, such as shown in U.S. Pat. No. 5,621,629, have been developed to provide a single meter that is capable of metering electrical energy associated with primary voltages that vary over a wide range. Although switching power supplies and voltage dividers are known for use in an electronic electricity meter, drawbacks exist with the currently available power supplies. Therefore, it is an object of the present invention to provide a power supply for an electronic electricity meter that addresses problems associated with currently available power supplies.

SUMMARY OF THE INVENTION

The present invention involves a method and apparatus for providing a power supply for operating the electronic components contained with an electronic electricity meter, where the electronic electricity meter is capable of metering electrical energy consumption over a wide range of input voltage utilizing a single meter. The power supply circuit of the invention compensates for the wide range of input voltages and creates a generally constant DC supply voltage for use in powering the electronic circuitry within the electronic electricity meter.

The power supply includes a transformer that has a primary winding that receives the line voltage and a secondary winding, where stored energy from the primary winding is discharged to the secondary winding. The secondary winding of the transformer creates and provides the output voltage for the power supply. A switch is connected to the primary winding of the transformer for selectively permitting and preventing the flow of current through the primary winding. When current is flowing through the primary winding, the core of the transformer is magnetized and no energy is flowing to the secondary winding. When the current path through the primary winding is broken, current is prevented from flowing through the primary winding and the stored energy in the primary winding is transferred to the secondary winding of the transformer to create an output voltage. The value of the output voltage is dictated by controlling the amount of time current is allowed to flow through the primary winding. The on and off time of the switch connected to the primary winding thus controls the output voltage at the secondary winding.

A control circuit is coupled to the switch to provide a control signal to the switch to control the cyclic operation of the switch between the on and off positions. Preferably, the control circuit is a timer having on and off cycle times that are accurately controllable. Thus, the control signal from the control unit controls the cycle time of the switch, and thus the output voltage of the power supply.

In one embodiment of the invention, an over voltage circuit is positioned to receive the half-wave rectified line voltage. The over voltage circuit compares the rectified line voltage to an upper voltage limit. If the value of the rectified line voltage exceeds the upper voltage limit, the over voltage circuit disables the generation of the control signal from the control unit to the switch. When the control signal is disabled, the current path through the primary winding of the transformer remains open such that current can no longer flow through the transformer. When current is prevented from flowing through the transformer, energy is not induced on the secondary winding of the transformer. Since energy is not being reflected from the secondary winding, no additional reflected voltage is present at the primary winding, thereby reducing the total voltage as seen by the switch of the power supply circuit. In this manner, the over voltage circuit limits the voltage present at the switch to protect the switch of the power supply circuit.

In the preferred embodiment of the invention, the over voltage circuit includes hysteresis such that the over voltage circuit generates the over voltage signal when the DC bus voltage exceeds the upper voltage limit. Once the DC bus voltage falls below the upper voltage limit, the over voltage circuit will not terminate the over voltage signal until the DC bus voltage falls below an adjusted upper voltage limit, which is less than the upper voltage limit.

In another embodiment of the invention, the power supply circuit includes a current limiting circuit that compares the current flowing through the primary winding of the transformer to an upper current limit. If the current flowing through the primary winding of the transformer exceeds the current limit, the current limiting circuit disables the generation of the control signal from the control unit, thus preventing further current flow through the primary winding of the transformer. Preferably, the current limiting circuit includes a timing circuit such that the operation of the transformer is disabled for a selected duration after the current returns below the current limit.

The control circuit of the power supply circuit generates a control signal having a constant off time and a variable, controllable on-time. The on time of the control signal is inversely proportional to the value of the line voltage. In this manner, the control signal decreases the on time of the transformer for higher line voltages and increases on time when the line voltage is at a lower value. This feature allows the control circuit to more accurately maintain a constant output voltage for varying line voltages.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
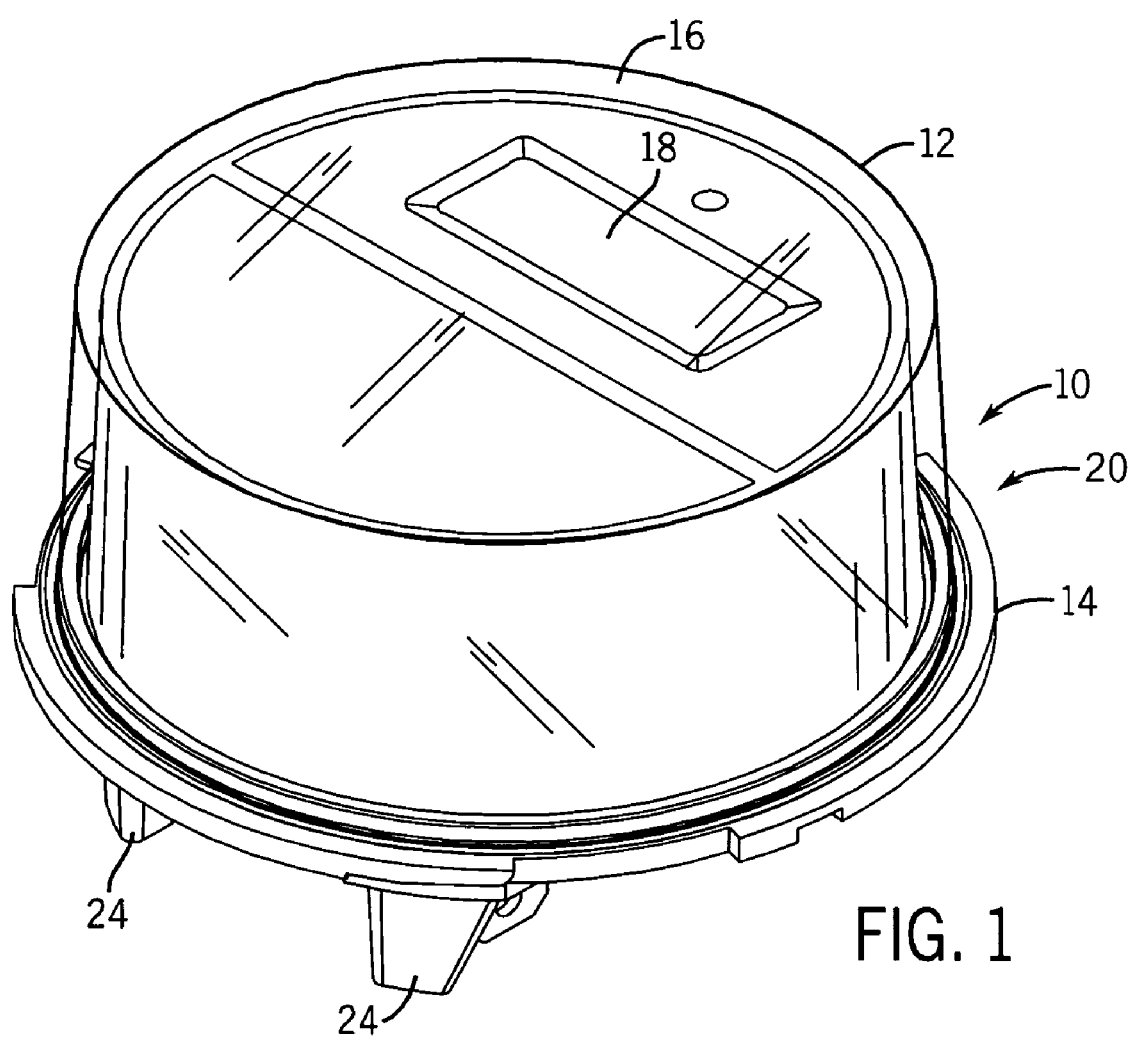
FIG. 1 is a perspective view of an electronic three phase electricity meter including the power supply of the present invention.

FIG. 1 illustrates a three-phase electronic electricity meter 10 constructed in accordance with the present invention. The electricity meter 10 includes an enclosed meter housing comprised of a cover member 12 mounted to a base member 14. The cover member 12 includes a generally clear face surface 16 that allows a digital display 18 to be read from the exterior of the electricity meter 10. The cover member 12 and base member 14 are joined to each other in a conventional manner such that the base member 14 and the cover member 16 define a sealed, enclosed meter housing. The meter housing prevents moisture and other environmental contaminants from reaching the internal circuitry contained within the three-phase electronic electricity meter 10.

In the present invention, an operating and measurement circuit is contained within the meter housing that operates to measure the energy consumption and control the digital display 18. The specific details of the measurement circuit will not be described in detail, since the measurement circuitry forms no part of the present invention. However, it should be understood that the measurement circuitry contained within the meter housing includes electronic components, including a current monitoring circuitry and processor, that require a constant DC voltage to operate. As can be seen in FIG. 1, the electricity meter 10 includes a plurality of blades 20 that provide a point of connection between the electronic electricity meter 10 of the present invention and the supply of electrical energy being monitored.

Figure 2:
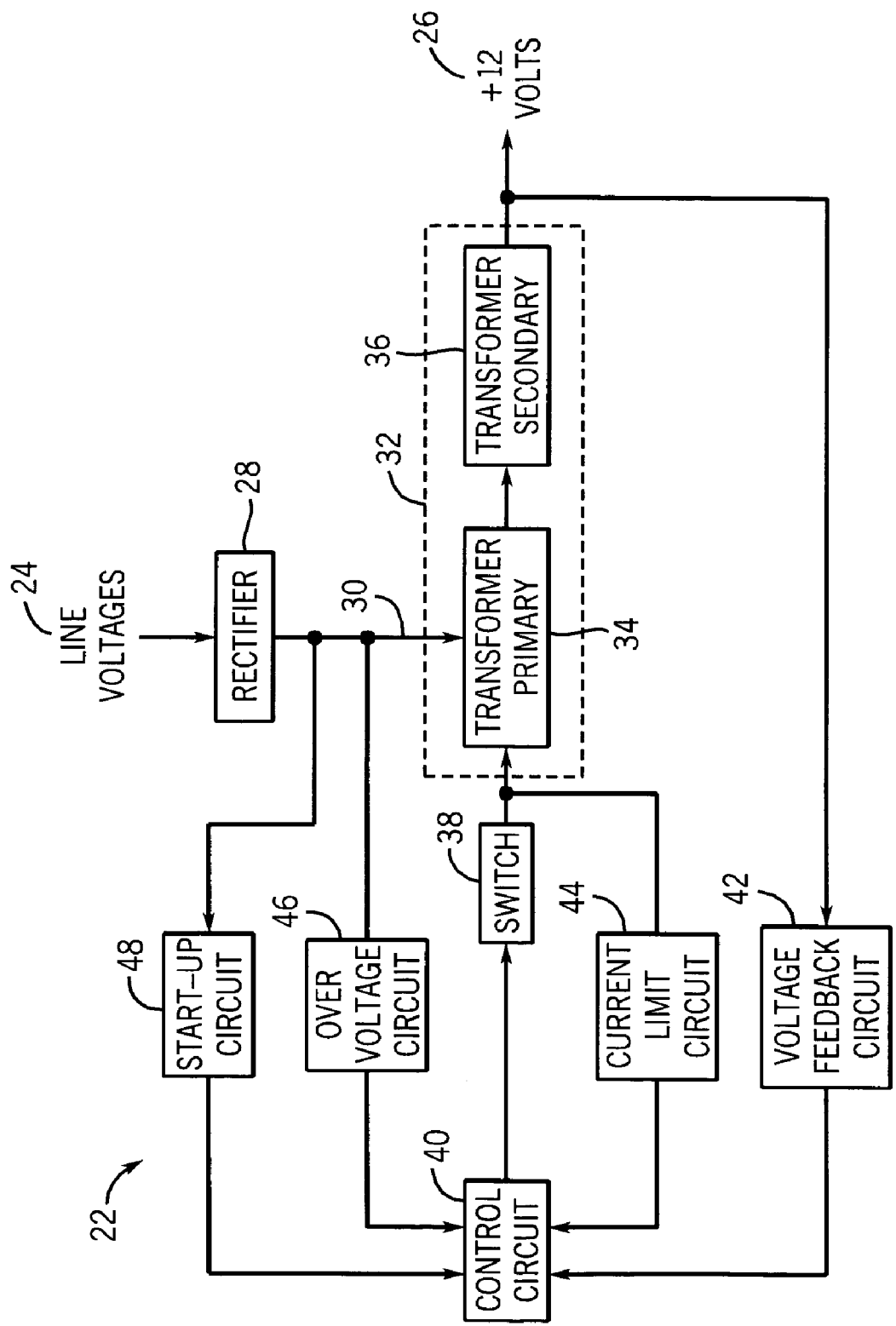
FIG. 2 is a block diagram of the power supply circuit of the present invention.

Referring now to FIG. 2, thereshown is a power supply circuit 22 for use in the electronic electricity meter. The power supply circuit 22 generally receives a three-phase AC line voltage 24 and converts the AC line voltage to a constant DC output voltage 26 that is used to power the internal operating circuitry contained within the electronic electricity meter. In the embodiment of the invention illustrated, the output voltage 26 is a constant 12 volts DC. The constant 12 volt DC output voltage 26 can be stepped up or down to any other DC voltage required by the internal circuitry within the electronic electricity meter in a known manner.

As described previously, the AC line voltage 24 received at the electronic electricity meter is typically in the range of between 96 and 630 volts AC. The power supply circuit 22 of the present invention converts the variable input line voltage 24 into a constant 12 volt DC output voltage 26.

As illustrated in FIG. 2, the three phase line voltage 24 is half-wave rectified by a rectifier circuit 28 to create a DC bus voltage 30. The DC bus voltage 30 is supplied to a main power converter 32. In the embodiment of the invention shown in FIG. 2, the main power converter 32 is a transformer having a primary winding 34 and a secondary winding 36. Further details of the primary and secondary windings of the main power converter 32 will be described in greater detail below.

As shown in FIG. 2, a switch 38 is connected to the primary winding 34 of the power converter 32. The switch 38 is selectively operable to permit and prevent the flow of current through the primary winding 34. The switch 38 is operable in response to a control signal generated by the control circuit 40. When the switch 38 is turned on, a connection is made to ground through the primary winding 34 and current flows through the primary winding to energize the magnetic core of the primary winding 34. When the switch 38 is in the off position, the connection of the primary winding 34 to ground is broken and the stored magnetic energy from the primary winding 34 of the transformer is transferred to the secondary winding 36. The secondary winding 36 of the transformer is connected to a smoothing circuit to generate the output voltage 26. The value of the output voltage 26 can be regulated by controlling the ratio of the on and off time of the switch 38. As shown, the operation of the switch 38 between the on and off positions is controlled by a control signal from the control circuit 40.

The power supply circuit 22 includes a voltage feedback circuit 42 positioned between the output voltage 26 and the control circuit 40. The voltage feedback circuit 42 compares the output voltage 26 to a desired reference voltage and generates a signal to inhibit the operation of the control circuit 40 if the output voltage exceeds the desired voltage. If the output voltage 26 falls below the desired reference voltage, the control unit 40 is able to generate the control signal to the switch. If the output voltage 28 exceeds the desired voltage, the voltage feedback circuit inhibits the generation of the control signal until the output voltage falls below the desired voltage.

In the embodiment of the invention illustrated in FIG. 2, the power supply circuit 22 also includes a current limiting circuit 44. The current limiting circuit 44 is particularly desirable to prevent damage to the power supply circuit 22 in the event of a secondary side failure of the power converter 32. In general, the current limit circuit 44 monitors the current in the primary winding 34 of the power converter 32. If the current in the primary winding 34 exceeds an upper current limit, the current limiting circuit 44 inhibits the generation of the control signal from the control circuit 40, which interrupts the operation of the power converter 32 for an interruption period. The current limiting circuit 44 is particularly important at the start up, when the transformer primary current becomes continuous while the output voltage is rising.

In addition to limiting the current through the transformer 32, the power supply circuit 22 of the present invention also includes an over voltage protection circuit 46. In the embodiment of the invention illustrated in FIG. 2, the switch 38 has a maximum voltage rating. As an example, the switch 38 in the present invention is a transistor rated to 1,000 volts. During the discharge of the primary winding 34 to the secondary winding 36, an additional 200 volts of reflected secondary voltage may appear at the primary winding 34. Thus, during discharge of the primary winding, the switch 38 sees the combination of the DC bus voltage 30 and the reflected voltage from the secondary winding 36. If the switch 38 is rated to 1,000 volts, this allows for safe operation up to a DC bus voltage of approximately 800 volts.

At the high end of the power supply's input range, the peak DC bus voltage 30 will reach approximately 814 volts. To prevent damage to the switch 38, the over voltage circuit 46 prevents operation of the power converter 32 for input voltages above an upper voltage limit. In the embodiment of the invention, the over voltage circuit 46 operates to prevent operation of the power converter 32 for input voltages above 700 volts. When the power converter 32 is interrupted, the switch 38 sees only the DC bus voltage 30.

As illustrated in FIG. 2, the over voltage circuit 46 monitors the voltage on the DC bus 30 and interrupts the generation of the control signal from the control circuit 40 when the bus voltage exceeds the upper voltage. When the bus voltage exceeds the upper voltage, current flow through the primary winding 34 is prevented.

The power supply circuit 22 includes a startup circuit 48 that is connected to the DC bus voltage 30. The startup circuit 48 includes a current source that charges a capacitor. Once the capacitor reaches an under voltage threshold, the startup circuit 48 signal the control circuit 40 to begin operation of the power converter 32.

As can be understood by the above description, the power supply circuit 22 of the present invention disables the operation of the power converter 32 when the rectified line voltage exceeds an upper voltage limit. Further, the power supply circuit 22 of the present invention provides a current limiting circuit to prevent damage to the power switch 38.

Figure 3:
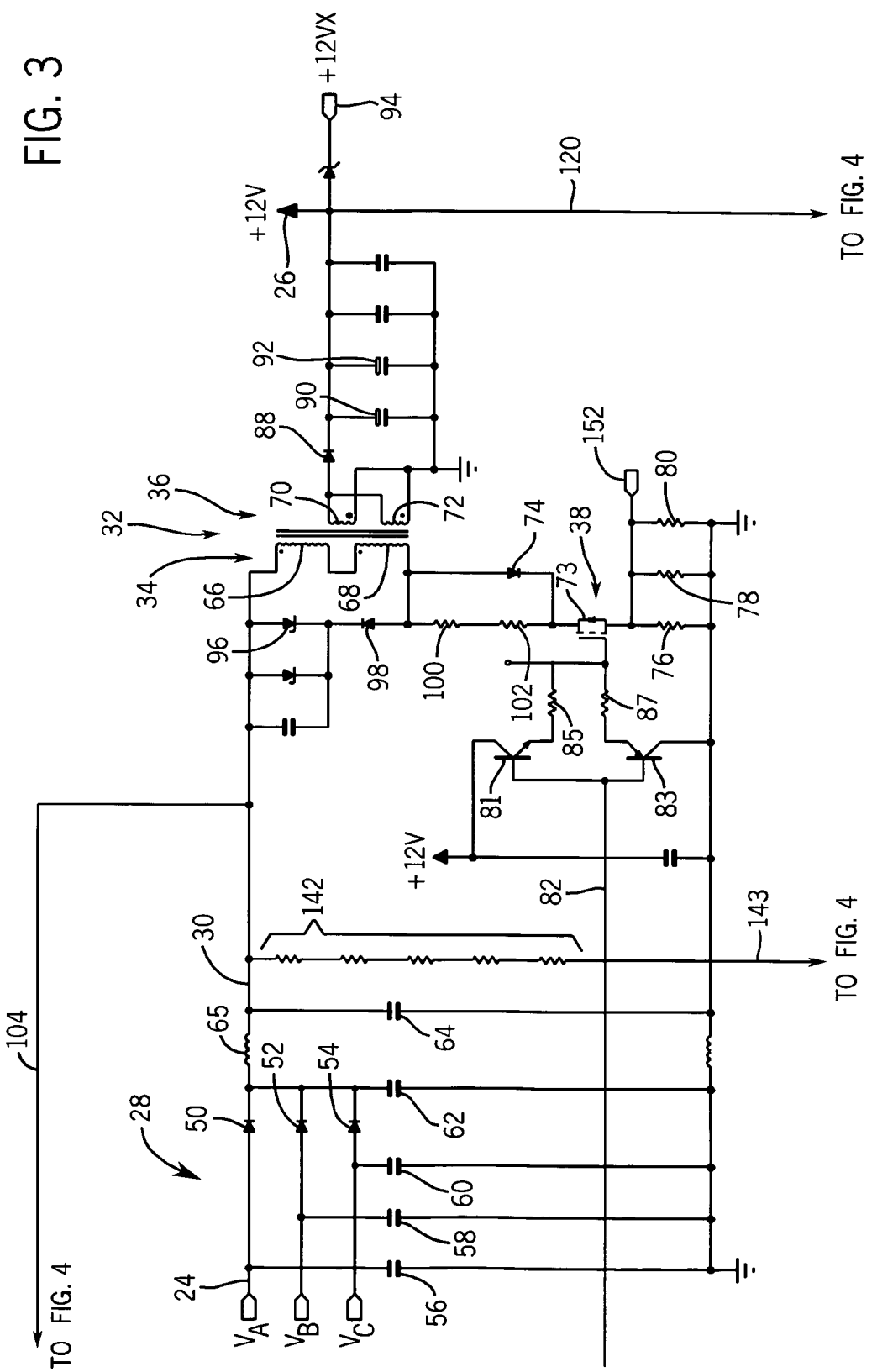
FIG. 3 is a partial circuit diagram of the power supply circuit of the present invention.
Figure 4:
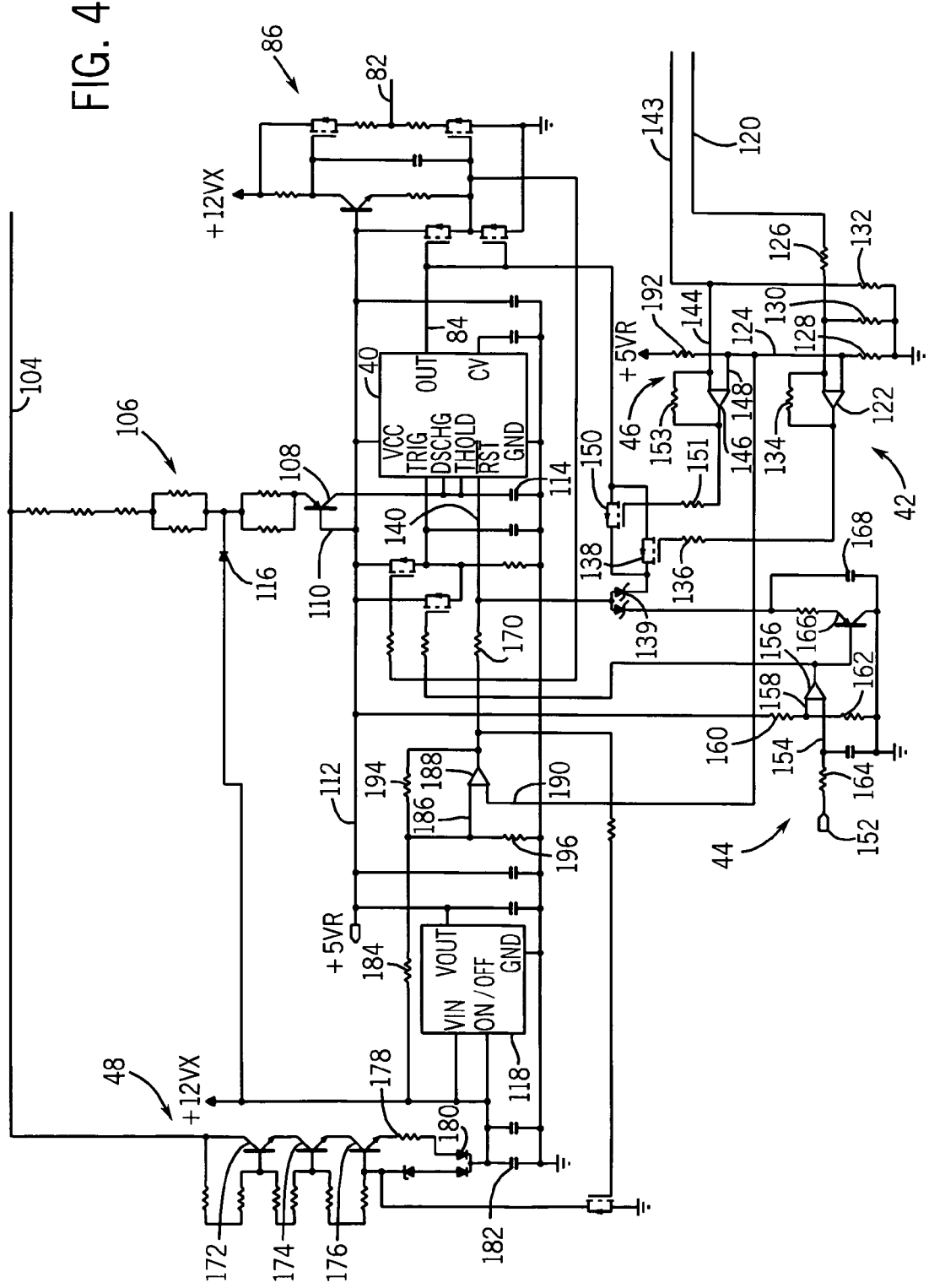
FIG. 4 is a partial circuit diagram of the power supply circuit of the present invention.

Referring now to FIGS. 3 and 4, thereshown is the detailed circuit schematic that embodies the block diagram of FIG. 2. Although a detailed circuit schematic is shown in FIGS. 3 and 4 to provide a preferred embodiment of the power supply circuit 22, it should be understood that other embodiments of the invention can be created while operating within the scope of the present invention.

As shown in FIG. 3, the three-phase AC line voltages 24 are connected to the input of the rectifier circuit 28. The rectifier circuit 28 includes diodes 50, 52 and 54 each connected to one phase of the line voltage. A series of capacitors 56, 58 and 60 are also connected to each phases of the line voltage 24. A pair of capacitors 62 and 64 are included in the circuit for EMC reasons such that the rectifier circuit 28 creates a half-wave rectified DC bus voltage at line 30. As described previously, the three-phase AC line voltage 24 may vary between 96 and 630 volts AC.

As illustrated in FIG. 3, the DC bus voltage 30 is applied to the primary winding 34 of the transformer 33, which functions as the power converter. In the embodiment of the invention illustrated, the primary winding 34 includes a first coil 66 and a second coil 68 connected in series. The secondary winding 36 of the transformer 33 also includes a first coil 70 and a second coil 72 connected in parallel.

In the embodiment of the invention shown, the main power switch 38 is a transistor positioned between the DC bus voltage and ground. When the main power switch 38 is turned on, a current path is created through diode 74, transistor 73 and resistors 76, 78 and 80 to ground. When the transistor 73 is turned on and a current path is created, magnetic energy builds in the primary winding 34 of the transformer 33.

The power switch 38 receives a control signal along line 82. Line 82 is coupled to the base of the transistors 81 and 83, which in turn are coupled to the transistor 73 through the resistors 85 and 87. Line 82 is also coupled to the output pin 84 of the timing control circuit 40 shown in FIG. 4. In the embodiment of the invention illustrated, the timing control circuit 40 is a conventional 555 timer that generates a periodic control signal that oscillates between zero and five volts at output pin 84. The control signal has a pre-set off time and an on time that is controlled by an input to the 555 timer. The output at pin 84 is coupled to a level shifting circuit 86 that converts the five volt control signal from the control circuit 40 to a level more suitable for driving the transistor 73 that forms the switch 38. The level shifting circuit 86 is a generally conventional circuit, the details of which do not form part of the present invention.

Referring back to FIG. 3, when the signal on line 82 turns the switch 38 on, the primary winding 34 is charged. When the signal on line 82 turns the switch 38 off, the current path through the switch 38 is interrupted. When the current path is interrupted, the energy stored in the primary winding 34 of the transformer 33 is transferred to the secondary windings 36. The transferred energy flows through the diode 88 and into the pair of parallel capacitors 90, 92 and ultimately to the load connected at point 94. As described previously, the on and off times for the switch 38 are regulated by the control signal from the control circuit 40 such that the output voltage 26 is maintained at approximately 12 volts DC.

During the transfer of energy from the primary winding 34 to the secondary winding 36 when the switch 38 is off, the primary winding 34 of the transformer 33 sees a reflected secondary voltage. During normal operating conditions, the reflected voltage is approximately 200 volts. Any additional energy stored in the primary leakage inductance of the transformer 33 is dissipated in the snubber circuit formed by diodes 96 and 98 which clamp the reflected secondary voltage to approximately 224 volts. Thus, at turnoff of the switch 38, the switch 38 will be exposed to the sum of the DC bus voltage present at line 30, which may range up to approximately 800 volts, plus up to an additional 224 volts of reflected voltage from the secondary winding 36.

In the embodiment of the invention illustrated, the transistor 73 that forms the switch 38 is available rated up to approximately 1,000 volts. As can be understood by the above description, the switch 38 may be subjected to up to 1,024 volts during peak voltage values and peak reflected voltage from the secondary winding 36. As will be described below, an over voltage circuit is utilized as part of the power supply circuit of the present invention to limit the voltage that appears at the switch 38.

In FIG. 3, the resistors 100, 102, in combination with the diode 74, form a damper that aids in dampening the parasitic resonant tank formed by the drain-source capacitants of the transistor 73 and the primary inductance of the transformer.

Referring now to FIG. 4, the timing control circuit 40 is configured to produce an output wave form at pin 84 that has a constant off time and an on time that is inversely proportional to the voltage on the DC bus 30. Thus, as the DC bus voltage increases, the on time of the control signal decreases and the amount of time current flows though the primary winding decreases. Likewise, if the voltage at the DC bus decreases, the on time of the control signal increases. In this manner, the control signal functions to maintain a generally constant DC output voltage over a variable AC line voltage range.

The voltage at the DC bus 30 is fed to the control circuit 40 from line 104. The DC bus voltage is fed through a resistor network 106 to transistor 108. The transistor 108 has its base 110 connected to a five volt reference voltage at line 112. The transistor 108 is connected to capacitor 114 and controls the charging time of capacitor 114. A diode 116 provides a maximum on-time clamp for the timing control circuit 40. In the embodiment of the invention illustrated, the diode 116 provides a maximum on-time clamp of approximately 6 μs As illustrated in FIG. 4, circuit 118 is connected to the 12 volt output voltage and generates the five volt reference signal on line 112. The five volt reference signal is used throughout the power supply circuit in the manner to be described below.

As can be understood from the combination of FIGS. 3 and 4, the output voltage 26 is applied along line 120 to the voltage feedback circuit 42. The voltage feedback circuit 42 includes a comparator 122 that compares the output voltage at line 120 to a reference voltage created at 124 by the combination of resistors 128 and 192. The output voltage on line 120 is fed through a resistor divider network including resistors 126 and 130. The resistor divider network is selected based on the desired output voltage for the circuit. In the embodiment of the invention shown, the reference voltage at 124 is approximately 2.5 volts. In order to regulate the output voltage to 12 volts, the resistor 126 is selected to be 9,100 ohms and the resistor 130 is selected to be 2,400 ohms. In order to reduce the noise susceptibility, approximately 200 mV of hysteresis is added to the comparator 122. To provide the desired hysteresis, a feedback resistor 134 is included in the circuit. An output resistor 136 is provided at the output of the comparator 122.

When the output voltage at line 120 is below the desired output voltage, the comparator 122 generates a low signal at its output, which is received at the transistor 138. Transistor 138 is coupled to the reset pin 140 of the control circuit 40 through diode 139. During times at which the output voltage at line 120 is below the desired output voltage, the control circuit 40 is able generate the control signal to the switch 38 to activate the transformer 33.

If the output voltage at line 120 is above the desired voltage, the comparator 122 outputs a high value to the transistor 138, which is received at the gate of the transistor. As illustrated, the source of transistor 138 receives the control signal present at the output pin 84 of the control circuit 40. When the control signal on pin 84 goes low, the transistor 138 pulls the reset pin 140 low through the diode 139. When the reset pin 140 is low, the output on pin 84 of the control circuit is held low and the switch 38 is held open such that current can no longer flow through the primary winding 34.

Once the output voltage falls below the desired voltage, the output of the comparator 122 goes low and the control circuit can operate to generate the control signal on pin 84. The use of the voltage feedback circuit 42 allows control over an exceedingly large range of line and load conditions without the associated problems of very small or large duty cycles. This is important since that the circuit of the present invention does not include any bulk capacitors on the high voltage DC rail and the transistor must be able to run over the entire line cycle.

Referring back to FIG. 3, it has been previously described that the preferred main power switch 38 is transistor 73 rated up to 1,000 volts. Since an additional 200 volts of reflected secondary voltage may be seen by the switch 38 in combination with the DC bus voltage 30 of up to 800 volts, an over voltage disable circuit 46 is provided. In accordance with the preferred embodiment of the invention, to prevent damage to the switch 38, the transformer 33 is prevented from transferring power from the primary coil 34 to the secondary coil 36 for voltages present at the DC bus of over 700 volts. The 700 volt upper voltage limit can be modified depending on the rating of the transistor 73. When the transformer 33 is not running, the switch 38 only sees the DC bus voltage 30.

The DC bus voltage 30 is fed through a voltage divider, including a series of resistors 142 and resistor 132, to the input pin 144 of a comparator 146 of the over voltage circuit 46, as shown in FIG. 4. The second input pin 148 of the comparator 146 is connected to the reference voltage present on line 124. As can be understood, the resistor network 142 and resistor 132 are selected such that the voltage at the pin 144 will exceed the reference voltage at line 124 when the DC line voltage exceeds 700 volts. If a different upper voltage limit is desired, the values of the resistors in the resistor divider network can be modified, as is well known.

When the DC bus voltage is below 700 volts, the comparator 146 outputs a low value that is received at the transistor 150 through the resistor 151. The low value at the transistor 150 maintains the transistor 150 in the off state, which enables the operation of the timing control circuit 40 and the generation of the control signal on output pin 84.

When the DC bus voltage exceeds 700 volts, the comparator 146 outputs a high signal to the transistor 150, which is received at the gate of the transistor. As illustrated, the source of transistor 150 receives the control signal present at the output pin 84 of the control circuit 40. When the control signal on pin 84 goes low, the transistor 150 pulls the reset pin 140 low through the diode 139. When the reset pin 140 is low, the output of the control circuit is held low and the switch 38 is held open such that current can no longer flow through the primary winding 34 of the transformer.

When the output pin 84 is disabled, the transformer is also disabled which results in the power switch 38 only seeing the DC bus voltage and not the reflected voltage from the secondary winding 36. The comparator 146 includes a feedback resistor 153 that is used to introduce hysteresis into the over voltage circuit 46. In the embodiment of the invention illustrated, the resistor values are selected such that the operation of the transformer is initially inhibited when the DC bus voltage exceeds 695 volts. The introduction of hysteresis into the circuit allows the transformer to only be reactivated when the DC bus voltage falls beneath an adjusted upper voltage limit or 679 volts. The inclusion of the hysteresis into the circuit ensures that the over voltage protection circuit 46 initially interrupts operation when the DC bus voltage approaches 700 volts and continues to suspend operation until the DC bus voltage falls to an acceptable level further below the 700 volt maximum.

Once the DC bus voltage falls below the 700 volt upper voltage limit, the output of the comparator 146 goes low and the control circuit can operate to generate the control signal on pin 84.

In addition to including an over voltage disable circuit, the power supply circuit 22 of the present invention includes a current limiting circuit 44. The current limiting circuit 44 includes an input 152. The input 152 senses the current flowing through the primary winding of the transformer, as represented by the voltage across the series resistors 76, 78 and 80 (FIG. 3). The current flowing through the series of resistors is the same current flowing through the primary winding 34 of the transformer 33.

The voltage at input 152 is fed through resistor 164 to input pin 154 of the comparator 156. The second pin 158 is fed by the reference voltage 112 after passing through a voltage divider consisting of resistors 160 and 162. When the voltage at the input pin 154 exceeds the upper current limit set by the resistors 160, 162, the comparator 156 outputs a low signal to the base of transistor 166. When the base of transistor 166 is low, reset pin 140 of the control circuit 40 is immediately pulled low to prevent the generation of the control signal at pin 84. When the control signal is no longer present, the operation of the transformer 33 is prevented.

As the base of the transistor 166 is pulled low, the capacitor 168 is discharged. Once the sensed current through the transformer falls below the upper current limit, the comparator 156 again outputs a high signal to the base of transistor 166. However, the reset pin 140 of the control circuit 40 does not go high until the capacitor 168 is charged. Thus, the operation of the transformer 33 is interrupted for a pre-selected period determined by capacitor 168 and resistor 170 even after the value of the current falls below the upper current limit.

Referring again to FIG. 4, the power supply circuit of the present invention also includes the start-up circuit 48. The start up circuit 48 includes current source formed by the transistors 172, 174 and 176. The transistors 172, 174 and 176 provide a trickle charge through resistor 178 and diode 180 to the capacitor 182. The voltage across the capacitor 182 is fed through resistor 184 to pin 186 of the under voltage comparator 188. Pin 190 of the comparator 188 receives a reference voltage defined by a voltage divider including resistor 192 and 128. The under voltage comparator 188 includes a feedback resistor 194 and grounding resistor 196. The resistors are selected such that the comparator outputs a high signal at approximately 15 volts and is turned off when the voltage across the capacitor 182 drops to approximately 8 volts. When the comparator 188 turns off, the under voltage lock out is released and the current source provided by the series transistors 172, 174 and 176 is disabled to minimize heat dissipation.

In the specific embodiment of the invention shown in the circuit diagrams of FIGS. 3 and 4, the specific values for many of the circuit elements are not shown since the values for these components are a matter of design choice as can be recognized by those skilled in the art. Further, although the specific design configurations are shown for the various operating components of the power supply circuit, it should be understood that other circuit designs can be utilized while operating within the scope of the present invention.

I claim:

1. A power supply for use in an electronic electricity meter operable to receive and monitor a three-phase line voltage, the power supply comprising:
   a voltage rectifier positioned to receive the line voltage and generate a DC bus voltage;
   a transformer having a primary winding and a secondary winding, wherein the DC bus voltage is applied to the primary winding such that current flows through the primary winding, wherein the primary winding discharges to the secondary winding to define an output voltage of the power supply;
   a switch connected to the primary winding for selectively permitting and preventing the flow of current through the primary winding, wherein when the current is prevented from flowing through the primary winding, the primary winding discharges to the secondary winding;
   a control circuit coupled to the switch to provide a control signal to the switch to control the operation of the switch between an on and an off position;
   a voltage feedback circuit positioned to receive the output voltage from the secondary winding of the transformer and operable to compare the output voltage to a desired reference voltage, wherein the voltage feedback circuit prevents the flow of current through the primary winding when the output voltage exceeds the desired reference voltage; and
   an over voltage circuit positioned to receive the DC bus voltage and coupled to the control circuit, wherein the over voltage circuit is operable to generate an over voltage signal to the control circuit to prevent the generation of the control signal by the control circuit to prevent the flow of current through the primary winding when the DC bus voltage exceeds an upper voltage limit.

2. The power supply of claim 1 further comprising a current limiting circuit operable to compare the current flowing through the primary winding to an upper current limit, wherein the current limiting circuit generates an over current signal to the control circuit to prevent generation of the control signal by the control circuit to prevent the flow of current through the primary winding when the sensed current exceeds the upper current limit.

3. The power supply of claim 2 wherein the current limiting circuit includes a timing circuit that controls the duration of the over current signal.

4. The power supply of claim 1 wherein the over voltage circuit includes hysteresis such that the over voltage circuit compares the DC bus voltage to a selected upper voltage limit and generates the over voltage signal when the DC bus voltage exceeds the upper voltage limit and terminates the over voltage signal when the DC bus voltage falls below an adjusted upper voltage limit less than the upper voltage limit.

5. The power supply of claim 1 wherein the line voltage received by the voltage rectifier is one of a wide range of service voltages supplied by an electrical service provider and wherein the output voltage of the power supply is independent of the line voltage.

6. The power supply of claim 1 wherein the primary winding includes a first coil and a second coil connected in series.

7. The power supply of claim 6 wherein the secondary winding of the transformer includes a first coil and a second coil connected in parallel.

8. The power supply of claim 1 wherein the control signal generated by the control circuit is a periodic signal having repeating pulses each separated by an off time, each pulse having an on time duration, wherein the on time duration is determined based upon the value of the DC bus voltage.

9. The power supply of claim 8 wherein the on time duration decreases as the value of the DC bus voltage increases and the on time duration increases as the DC bus voltage decreases.

10. A power supply for use in an electronic electricity meter operable to receive and monitor a three-phase line voltage, the power supply comprising:
   a voltage rectifier positioned to receive the line voltage and generate a DC bus voltage;
   a transformer having a primary winding and a secondary winding, wherein the DC bus voltage is applied to the primary winding such that current flows through the primary winding, wherein the primary winding discharges to the secondary winding to define an output voltage of the power supply;
   a switch connected to the primary winding for selectively permitting and preventing the flow of current through the primary winding, wherein when the current is prevented from flowing through the primary winding, the primary winding discharges to the secondary winding;

a control circuit coupled to the switch to provide a control signal to the switch to control the operation of the switch between an on and an off position;

an over voltage circuit positioned to receive the DC bus voltage and coupled to the control circuit, wherein the over voltage circuit is operable to generate an over voltage signal to the control circuit to prevent the generation of the control signal by the control circuit to prevent the flow of current through the primary winding when the DC bus voltage exceeds an upper voltage limit; and a current limiting circuit operable to compare the current flowing through the primary winding to an upper current limit, wherein the current limit circuit generates an over current signal to the control circuit to prevent the generation of the control signal by the control circuit when the sense current exceeds the upper current limit;

wherein the control signal generated by the control circuit is a periodic signal having repeating pulses each separated by an off time, each pulse having an on time duration, wherein the on time duration is determined based upon the value of the DC bus voltage.

11. The power supply of claim 10 wherein the on time duration decreases as the value of the DC bus voltage increases and the on time duration increases as the DC bus voltage decreases.

12. The power supply of claim 10 wherein the current limiting circuit includes a timing circuit that controls the duration of the over current signal.

13. The power supply of claim 10 wherein the over voltage circuit includes hysteresis such that the over voltage circuit compares the DC bus voltage to the upper voltage limit and generates the over voltage signal when the DC bus voltage exceeds the upper voltage limit and terminates the over voltage signal when the DC bus voltage falls below an adjusted upper voltage limit less than the upper voltage limit.

14. The method for supplying power to the operating components of an electronic electricity meter that meters electrical energy, the energy having a variable line voltage, the method comprising the steps of:

rectifying the line voltage to generate a DC bus voltage;

providing a transformer having a primary winding and a secondary winding;

providing the DC bus voltage to the primary winding of the transformer;

providing a switch that selectively permits and prevents a flow of current through the primary winding, wherein the primary winding discharges to the secondary winding upon the prevention of current flow through the primary winding;

providing a control circuit that controls the operation of the switch;

comparing the value of the DC bus voltage to an upper voltage limit and generating an over voltage signal to the control circuit when the DC bus voltage exceeds the upper voltage limit;

comparing the current flowing through the primary winding of the transformer to an upper current limit;

generating an over current signal to the control unit when the current flowing through the primary winding exceeds the upper current limit; and operating the control circuit to prevent the flow of current through the primary winding upon receipt of the over voltage signal or the over current signal at the control circuit.

15. The method of claim 14 wherein the control circuit prevents the discharge of the primary winding upon receipt of the over current signal.

* * * * *